US005244994A

United States Patent [19]

Linehan

[11] Patent Number: 5,244,994

[45] Date of Patent: Sep. 14, 1993

[54] BLEACHABLE POLYMERIC FILTER DYES

[75] Inventor: Sharon S. Linehan, Rochester, N.Y.

[73] Assignee: Eastman Kodak Company, Rochester, N.Y.

[21] Appl. No.: 855,371

[22] Filed: Mar. 20, 1992

[51] Int. Cl.$^5$ .............................................. C08F 26/06

[52] U.S. Cl. .......................................... 526/259; 8/647

[58] Field of Search ............................. 526/259; 8/647

[56] References Cited

U.S. PATENT DOCUMENTS

| | | | |
|---|---|---|---|
| 2,843,570 | 7/1958 | Coover et al. | 526/259 |
| 3,672,898 | 6/1972 | Schwan et al. | 96/74 |
| 4,059,448 | 11/1977 | Sugiyama et al. | 96/84 |
| 4,268,622 | 5/1981 | Adachi et al. | 430/513 |
| 4,345,017 | 8/1982 | Cournoyer et al. | 430/221 |

FOREIGN PATENT DOCUMENTS

| | | | |
|---|---|---|---|
| 50-28827 | 3/1975 | Japan . | |
| 58-4142 | 1/1982 | Japan . | |
| 58-21247 | 2/1983 | Japan . | |
| 545529 | 6/1942 | United Kingdom . | |
| 1273746 | 5/1972 | United Kingdom | 526/259 |

*Primary Examiner*—Joseph L. Schofer
*Assistant Examiner*—N. Sarofim
*Attorney, Agent, or Firm*—Robert A. Gerlach

[57] ABSTRACT

Rapidly processible and irreversibly bleachable polymeric filter dyes for photographic elements are provided wherein a benzoxazle styryl chromophore is covalently bonded to a copolymer, particularly a copolymer of methyl acrylate, methacrylic acid, and sulfoethylmethacrylate, as well as filter layers and photosensitive elements containing them.

8 Claims, No Drawings

BLEACHABLE POLYMERIC FILTER DYES

FIELD OF THE INVENTION

This invention relates to bleachable polymeric filter dyes for photographic elements and photographic elements containing bleachable filter dyes covalently bonded to a polymer.

BACKGROUND OF THE INVENTION

Photographic light-sensitive materials often have colored emulsion layers and other hydrophilic colloidal layers colored in order to absorb light within specific wavelengths. When necessary to control the spectroscopic composition of light falling on a light-sensitive layer, a colored filter layer further removed from the base than the emulsion layer is usually employed. In films containing multiple emulsion layers, a filter layer is sometimes positioned between the emulsion layers.

Colored filter layers usually incorporate water-soluble dyes to provide the necessary color. Such dyes must have the right spectral absorption for the intended purpose and be photochemically inert; that is, they must have no chemically adverse effect on the performance of the photographic quality of the film such as reduction of sensitivity, degradation of latent image, fogging, and the like. In this context, the dye used should not exert a spectral sensitizing effect on an emulsion which should not be spectrally sensitized. Nor should they lower the degree of spectral sensitization of an emulsion which has been spectrally sensitized or broaden, narrow, or shift wavelength or create a new maximum wavelength for spectral sensitization.

Dyes used in a filter layer should discolor or be eluted into the treating solution or wash water during development in order not to leave detrimental color on the light-sensitive material being treated. While a number of methods are available for selectively coloring a colloidal filter layer, often a hydrophilic polymer having an electric charge opposite that of the dye ions is added to the hydrophilic colloidal layer as a mordant which interacts with the dye molecules to contain the dye locally in a specific colloidal layer. When mordanting with a polymer is used, the contact of the dye containing layer with the other colloidal layers in a wet condition often results in diffusion of the dye from the former into the latter layer. This diffusion depends on the chemical structure of the mordant used and the structure of the dye involved.

When a high molecular weight mordant is used, color is likely to remain on the light-sensitive material after photographic treatment, particularly when shortened processing times are used. Presumably, this is caused by retention of dye or a product of reversible discoloration in the layer containing the mordant. The mordant can recombine with the dye even in a developing solution, depending on the structure of the mordant and nature of the dye employed.

Various dyes have been proposed as offering possible solutions to such problems. U.S. Pat. Nos. 3,672,898; 4,345,017; 4,059,448; and 4,268,622 describe indolenes, butadienes, styryls, pyrazolones, cyanines, and the like as possible candidates. Japanese Kokai Patent Nos. 50-28827, 58-21247, and 58-4142 describe dispersions of dyes in alkali soluble resins. Such dyes nevertheless tend to spectrally sensitize a photographic emulsion which has not been spectrally sensitized and alter the degree of spectral sensitization of an emulsion which has been spectrally sensitized. Great Britain Patent 545,529 describes azo dyes having a resinous nature and 506,385 describes oxonol dyes irreversibly decolored in developers containing sulfite which do not adversely influence the photographic properties of photographic emulsions. However, such dyes cannot be mordanted adequately and diffuse from the basic polymer containing layer to other layers. Further, strong mordanting to control dye mobility leads to inhibition of sulfite bleaching.

The need for nonwandering filter dyes, particularly for blue and green X-ray film, is critical to reduce crossover exposure and reduce sensitizing dye stain, particularly in green X-ray film. In photosensitive film, nonwandering filter dyes prevent blue light punch through onto green sensitive emulsions and, particularly in microfilm, are needed to eliminate hypo retention and filter dye stain which results from the use of mordants currently employed.

SUMMARY OF THE INVENTION

Irreversibly bleachable polymeric filter dyes are provided which are immobile and therefore can be permanently incorporated into coating compositions. The nonwandering polymeric dyes of the invention are coatable on any suitable substrate with gelatin in a filter layer which decolorizes or bleaches very quickly and irreversibly in a high pH sulfite solution.

The nonwandering filter dye polymers of the invention can be used in any composition processed using sulfite bleach. They improve viewbox quality and reduce sensitizing dye stain when excess sensitizing dye is used to absorb unwanted green light. The polymeric dyes of the invention are stable before processing and removed quickly when very rapid processing is required, such as, for example, when processing X-ray film.

The bleachable polymeric filter dyes of the invention are polymers containing a covalently bonded benzoxazole-styryl dye chromophore in the polymer structure. In the context of the invention, only benzoxazole-styryl dyes bleach irreversibly and fast, in thirty seconds or less, under sulfite developing conditions.

Any suitable polymer capable of covalently bonding with the benzoxazole-styryl dye monomer can be used in the polymeric filter dye of the invention. Methyl acrylate, methacrylic acid, methacrylate, acrylamide, methacrylamide, and acrylate polymers and copolymers are preferred.

The polymer can contain any desired amount of the dye chromophore or monomer, preferably ranging from about 2 to about 5 mol percent. Higher dye loading may inhibit polymerization; lower dye loading may not provide optimum results for the intended use.

Preferred dye polymers of the invention are polymers of methyl acrylate (C)/methacrylic acid (E)/2-sulfoethyl methacrylate (sodium salt) (D)/ 5-acrylamido-N-ethyl-2-(4-dimethylaminophenyl ethylidenyl) benzoxazolium p-toluene sulfonate (A), particularly at mol ratio ranges of from about 75 to 92 (C), about 20 to 3 (E), about 3 to 10 (D), and about 2 to 5 (A). Most preferred are CEDA poymers having mol ratios of 85–90 (A), 5–10 (D), 3–5 (E), and 2 (A).

DETAILED DESCRIPTION OF THE INVENTION

The benzoxazole styryl dyes of the invention can be incorporated into any suitable polymer without regard to the viscosity or molecular weight of the polymer. Polymers and copolymers of acrylamide, methacrylamide, acrylate, and methacrylate polymers and copolymers are preferred.

It is preferred that the polymeric dye of the invention contains an effective amount of a suitable charged monomer to provide good coatability with gelatin. Preferably, amounts ranging from about 3 to about 10 mol percent of the dye polymer of any suitable charged monomer such as a sulfoalkyl methacrylate or acrylamido alkyl sulfonic acid having one to twelve carbon atoms in a normal, iso, cyclo, or combination thereof configurations are preferred. For example, the alkyl group can be a methyl, ethyl, propyl, isopropyl, pentyl, cyclohexyl, methyl cyclohexyl, diethylcyclohexyl, decyl, nonyl, dicyclohexyl, dodecyl, combinations thereof and the like.

The use of the above monomers, which are preferably incorporated in the form of their sodium salt, also helps provide complete bleaching for water soluble polymeric dyes. Particularly preferred are 2-sulfoethyl methacrylate and 2-acrylamido-2-methylpropane sulfonic acid or a mixture thereof.

To insure complete bleaching when very hydrophobic or water insoluble polymeric dyes are used, from about 5 to about 25 mol percent of the polymer is preferably a sulfite solution soluble acidic monomer. Any suitable sulfite solution soluble acidic monomer or mixture thereof can be used, preferably acrylic and/or methacrylic acid.

The chromophore-containing polymers of the invention can be incorporated in any suitable amount that will provide layer coverage of from about 5 to about 80 mg dye-polymer/$ft^2$, preferably from about 8 to about 45 mg/$ft^2$.

The dye polymers of the invention can be incorporated in any suitable manner into a hydrophilic colloidal layer of a light-sensitive material. A solution of the dyes of the invention can be added to an aqueous solution of hydrophilic colloids and the resulting mixed solution can be coated in known manner on a film base or any other layer forming the light-sensitive material. The hydrophilic layer can contain any other suitable material for improving the properties of the light-sensitive material such as a hardening agent, a coating assistant, a pasticizer, a slip agent, a matting agent, an emulsion polymerized latex, an antistatic agent, an ultraviolet absorber, an oxidation inhibitor, a surfactant, and the like.

Some such suitable hardeners are disclosed, for example, in U.S. Pat. Nos. 1,870,354; 3,380,829; 3,047,394; 3,091,537; 3,325,287; 2,080,019; 2,726,162; 3,725,925; 3,255,000; 3,321,313 and 3,057,723, hereby incorporated herein by reference and the like.

Some suitable surface active agents which can be used as coating aids or for antistatic purposes, improvement of sliding properties and the like are disclosed, for example, in U.S. Pat. Nos. 3,294,540; 2,240,472; 2,831,766; 2,739,891; 2,359,980; 2,409,930; 2,447,750; 3,726,683; 2,823,123; and 3,415,649, hereby incorporated herein by reference and the like.

Photographic emulsions used to prepare the photosensitive materials of the invention can be spectrally sensitized with any suitable dyes including methine dyes and the like. Other suitable sensitizing dyes are disclosed, for example, in U.S. Pat. Nos. 2,231,658; 2,493,748; 2,503,776; 2,519,001; 2,912,329; 3,656,959; 33,694,217; 3,837,862; 3,814,609; 3,769,301; and 3,703,377, hereby incorporated herein by reference including combinations, particularly for supersensitization. The emulsion can also contain a dye having no spectral sensitizing action itself, or a material which does not absorb visible rays but which is capable of supersensitization.

Any suitable lubricating agents can be used in the hydrophilic colloidal layer containing the dyes of the invention including higher alcohol esters of higher fatty acids, casein, higher fatty acid calcium salts, silicone compounds, liquid paraffin and the like as described in U.S. Pat. Nos. 2,588,756; 3,121,060; 3,295,979; 3,042,522 and 3,489,567, hereby incorporated herein by reference and the like.

Any suitable plasticizer can be used such as glycerin, diols, trihydric aliphatic alcohols and the like particularly as described in U.S. Pat. Nos. 2,960,404 and 3,520,694, hereby incorporated herein by reference and the like.

Matting agents and antifoggants known in the art can be used including thos disclosed in U.S. Pat. Nos. 2,322,037; 3,079,257; 3,022,169; 2,336,327; 2,360,290; 2,403,721; 2,728,659; 2,732,300; 2,735,765; 2,418,613; 2,675,314; 2,710,801; 2,816,028; 3,457,079; and 2,384,658, hereby incorporated herein by reference and the like.

Any ultraviolet light-absorbing agents such as the compounds of the benzophenone series, the benzotriazole series, the thiazolidine series and the like can be used. Any brightening agents can be used including agents of the stilbene series, the triazine series, the oxazole series, the coumarin series and the like.

Any suitable hydrophilic colloid can be used to prepare photosensitive materials in accordance with the invention. Examples include gelatin (lime processed or acid processed), gelatin derivatives produced by reacting gelatin with with other high polymers, albumin and casein, cellulose derivatives such as hydroxyethyl cellulose and carboxymethyl cellulose, sugar derivatives such as agar, sodium alginate and starch derivatives, polymeric materials such as polvinyl alcohol-hemiacetal, poly-N-vinyl pyrrolidone, polyacrylic acid, polyacrylamide, polyvinylimidazole, and the like. Other suitable gelatin derivatives are disclosed in U.S. Pat. Nos. 2,614,928; 2,763,639; 3,118,766; 3,132,945; 3,186,846; 3,312,553; 4,268,622; 4,059,448; 2,763,625; 2,831,767; 2,956,884; 3,879,205 and the like which are hereby incorporated herein by reference.

Silver halide photographic emulsions can be prepared using conventional techniques depending on the desired end-use of the photosensitive element. Silver chloride, silver chlorobromide, silver bromide, silver bromoiodide, silver clororbromoidoide and the like can be used as the silver halide. Any known protective colloid can be used individually or in combination with the gelatin or gelatin derivative in the preparation of the photosensitive emulsion. Known processes can be used to prepare the silver halide emulsion which can be coated by any suitable method on any suitable substrate in the preparation of the photographic elements of the invention. Coating methods include dip coating, curtain coating, roller coating, extrusion coating and the like as disclosed, for example in U.S. Pat. Nos. 2,681,294;

4,059,448; 2,761,791; 2,941,898 and the like which are hereby incorporated herein by reference. Two or more layers can be coated at the same time, if desired.

Any suitable substrate can be used in the preparation of the photographic elements of the invention, including transparent and opaque supports. Some suitable supports include various kinds of glasses such as soda glass, potash glass, borosilicate glass, quartz glass and the like; synthetic high molecular weight film materials such as polyalkyl acrylates or methacrylates, polystyrene, polyvinyl chloride, polycarbonate, polyesters such as polyethylene terephthalate, polyamides such as nylon, films of semi-synthetic high molecular weight materials such as cellulose nitrate, cellulose acetate, cellulose acetate butyrate; paper, baryta coated paper, paper coated with alpha olefin polymers, synthetic paper e.g. of polystyrene, ceramics, metals, and the like.

The polymeric filter dyes of the invention are particularly useful in radiographic or X-ray elements which require very fast processing times as described, for example, in U.S. Pat. No. 4,900,652 which is hereby incorporated herein by reference. Although the dye-polymers of the invention function extremely well, even when fastest processing conditions are employed, it is to be understood that they also provide the advantages described herein when slower processes or processing conditions are employed.

In a preferred embodiment, an X-ray film is developed, fixed, and washed in a 90 second 35° C. process cycle which allows only about 30 seconds for each step.

A preferred development step employs a developer/replenisher containing about 700 ml water, 15.8 ml strontium chloride hexahydrate, 8.8 mg lithium carbonate, 12.5 mg Lignosite 458[Georgia Pacific]), 0.06 g of 5-methylbenzotriazole, 8.85 g of sodium metabisulfite, 42.75 g of potassium hydroxide as a 45% solution, 0.56 g of boric anhydride 60 mesh (boron oxide), 4.74 g of anhydrous sodium carbonate, 3.75 g of anhydrous sodium bicarbonate, 10 g of diethylene glycol, 133.5 g of potassium sulfite (45% solution), 5.33 g of diethylenetriaminepentaacetic acid pentasodium salt (40% solution), 22 g of hydroquinone, 12.5 g of glacial acetic acid, 1.35 g of 1-phenyl-3-pyrazolidinone, 127 mg of 5-nitroindazole, 8.85 g of glutaraldehyde (50% solution), 3.45 g of sodium bromide, and sufficient water to make 1 liter at a pH at 27° C. of 10+/−0.1. The developer contains the sulfite which renders the dye colorless and hydroxide and water at pH 10 to render the dye irreversibly bleached.

A preferred fixing step employs about 600 ml water, 20.7 g of glacial acetic acid, 4 g of sodium hydroxide (50% solution), 8.8 mg of anhydrous lithium carbonate, 15.8 mg of strontium chloride (hexahydrate), 238.8 g of ammonium thiosulfate (56.5% ammonium thiosulfate, 4% ammonium sulfite), 0.8 g of potassium iodide, 35.5 g of anhydrous sodium thiosulfate, 4.9 g of sodium metabisulfite, 3.23 g of sodium gluconate, 23.15 g of aluminum sulfate (25% solution), and sufficient water to make 1 liter at a pH at 27° C. of 4.1+/−0.1. The fixer solution contains the thiosulfate which dissolves and removes the undeveloped silver salts.

Filter layers of the invention are easily decolored during processing with no color remaining on the light sensitive material after it has been processed. The photographic treating solution is not contaminated by the dyes of the invention. Likewise, the dyes of the invention are not detrimental to the photographic properties of an emulsion layer located advantageously adjacent to a filter layer containing a dye or dyes of the invention. The sensitivity or gradation of the photographic emulsion layer is not reduced or weakened in any way other than for the filter effect of the filter layer. No fogging occurs. This is true with respect to the photographic properties of the light-sensitive material both in the sensitive wavelength region specific to silver halide and a color sensitized region. No such detrimental effect appears in the light-sensitive material even after the passage of time after manufacture.

The chromophore-containing polymeric dyes of the invention are fixed in the filter layer and do not diffuse into any other layer. Accordingly, a photographic light-sensitive material having superior spectral and other photographic properties is obtained in which the sensitivity or gradation of the photographic emulsion layer does not undergo any unexpected reduction that would otherwise be caused by undesirable spectral effects which occur when dye diffuses from the filter layer. The dyes of the invention are also capable of functioning in an anti-halation layer in black-and-white and color photographic light-sensitive materials, including those having multiple layers.

Any processes and processing conditions known for developing photographic light-sensitive materials can be used to process the photographic elements of the invention including any of those disclosed in U.S. Pat. No. 4,059,448 incorporated herein by reference.

The invention is further illustrated but is not intended to be limited by the following examples in which all parts and percentages are by weight unless otherwise indicated.

EXAMPLE 1

A dye of the invention is prepared by dissolving about 369 parts of 2-amino-4-nitrophenol in about 600 ml of warm pyridine in a 2 liter three-necked flask equipped with a mechanical stirrer, a Dean & Stark adapter or glass trap to collect distilled off solvent, and a condenser. About 600 parts of triethyl orthoacetate are added to the flask while refluxing using an oil bath maintained at 120°-140° C. The ethanol formed is distilled off followed by the pyridine until about 500 ml of total solvent are removed. The reaction mixture is stirred overnight at room temperature after which about 1500 ml of ethanol are added to precipitate the product. Filtering provided 5-nitro-2-methylbenzoxazole (1) as a tannish-brown solid which is washed with ethanol, ethyl acetate, and then ligroin, and dried under vacuum.

About 339 parts of (1) are hydrogenated in ethanol using Pt/C at high pressure at room temperature. The ethanol is removed using a rotary evaporator and 5-amino-2-methylbenzoxazole (2), obtained as a reddish-brown solid, is dried under vacuum.

About 150 parts of (2) are dissolved in about 1200 ml of warm tetrahydrofuran in a 3 liter three-necked flask equipped with a mechanical stirrer and dropping funnel. About 113 parts of triethylamine are added to the flask and then cooled to 0° C. using an ice bath. About 100 parts of acryloyl chloride are combined with about 300 ml of tetrahydrofuran in a dropping funnel and added dropwise to the flask while stirring under dry nitrogen. The mixture in the flask is allowed to return to room temperature while being stirred overnight and then filtered. The filter is stirred in about 1 liter of warm tetrahydrofuran for about thirty minutes and filtered again. Both filtrates are combined and about 10 ml of nitrobenzene are added to inhibit polymerization. Solvent is removed using a rotary evaporator and ethyl ether is added to solidify the product. The dark brown solid obtained after filtering is washed with methylene chloride, then ethyl ether to provide 5-acrylamido-2-methyl benzoxazole (3) as a tan solid after drying under vacuum.

About 100 parts of (3) are combined with about 109 parts of ethyl p-toluene sulfonate, 100 ml dimethylacetamide, and 5 ml p-nitrophenol (to inhibit polymerization) in a 500 ml three-necked flask equipped with a mechanical stirrer and condenser. The reaction mixture is heated at about 120° C. for about 5 hours while stirring under argon, then stirred at room temperature for about 15 hours, monitored using thin layer chromatography (TLC). After the reaction mixture is cooled to room temperature, it is poured into about 1500 ml of dry ethyl ether, decanted and stirred in fresh ethyl ether. The ethyl ether procedure is repeated until the oil product changes to a tacky solid which is then allowed to stand in ethyl ether overnight. The solid is filtered off and washed several times with butyronitrile to remove all starting material. The solid is washed further with ethyl ether and dried to yield 3-ethyl-5-acrylamido-2-methylbenzoxazolium p-toluene sulfonate (4) as a mustard-yellow solid.

About 50 parts of (4) are combined with about 37 parts of p-dimethylaminobenzaldehyde, about 3 ml p-nitrophenol, and about 500 ml of acetic anhydride in a 1 liter three-necked flask equipped with a mechanical stirrer and a reflux adapter. The mixture is stirred for about 20 minutes under argon while being heated in an oil bath starting at about 120° C. decreasing to about 100° C. The reaction mixture becomes very thick and is cooled for about 20 minutes at room temperature before being filtered. The filtered product is washed with acetic anhydride and ethyl ether, then allowed to stand in ethyl ether overnight. After filtering and washing with ethyl ether, the burnt-orange colored solid product is slurried in acetone, filtered, washed with acetone, slurried in ethyl ether, filtered, and dried under vacuum. The dye product is 5-acrylamido-N-ethyl-2-(4-dimethylaminophenylethylidenyl) benzoxazolium p-toluene sulfonate (A).

The procedure described in the preceding paragraph is repeated using about 9 parts of (4), 9 parts of 9-formyl julolidine, half a ml of p-nitrophenol and 90 ml of acetic anhydride in a 250 ml flask. The resulting magenta dye solid is 5-acrylamido-N-ethyl-2-(9-julolidinylethylidenyl)benzoxazolium p-toluene sulfonate (B).

A 90/5/3/2 mol percent polymer of methyl acrylate (C)/methacrylic acid (E)/2-sulfoethyl methacrylate(-sodium salt) (D)/5-acrylamido-N-ethyl-2-(4-dimethylaminophenyl ethylidenyl) benzoxazolium p-toluene sulfonate (A) is prepared by combining about 52 ml of C, 3 ml of E, 4 parts of D, 7 parts of A and about 210 ml of dimethylsulfoxide in a 500 ml three-necked flask equipped with a mechanical stirrer and a condenser. An oil bath is used to heat the reaction mixture to about 90° C. to dissolve the monomers, after which the temperature of the reaction mixture is maintained at about 65° C. After sparging the reaction mixture with argon for about 20 minutes, about 0.32 part of azobisisobutyronitrile (free radical polymerization initiator) is added. The reaction mixture is stirred at 65° C. overnight under argon with a slow continuous flow of argon through the solution. The resulting viscous polymer solution is allowed to cool to room temperature. About 300 ml of methanol are added with stirring. While still stirring vigorously, a solution of 15 ml of surfactant I

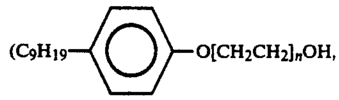

Olin 10G) in about 600 ml water is added to the polymer which is then dialyzed versus water for about 4 hours. After the dialysis bags are changed, the polymer is dialyzed for 2 days versus water. About 52 grams of the CEDA (90/5/3/2 mol percent) polymer (poly[methyl acrylate-co-methacrylic acid-co-2-sulfoethyl methacrylate, sodium salt-co-5-acrylamido-N-ethyl-2-(4-dimethylaminophenyl ethylidenyl)benzoxazolium p-toluene sulfonate]) (2.9% solids red-orange opaque dispersion) are obtained.

Additional polymeric dyes identified in Table 1 were prepared as described above. The polymeric dyes were then formulated into coating compositions for testing.

For % stain and % wandering tests, about 0.3 g of dye-polymers 1-3 were respectively dissolved in about 43 ml of water and about 0.09 g of surfactant I (0.9 ml of 10 surfactant I in water) was added. About 1 g of gelatin was then added and dissolved at a temperature of about 50° C. About 0.01 g of bis(vinylsulfonylmethyl)ether (BVSME) (0.5 ml of 2% BVSME in water) was added and the resulting solution was immediately extrusion coated onto a subbed polyethylene terephthalate film base (0.007 in thick) to provide 100 mg/ft$^2$ gelatin, 30 mg/ft$^2$ dye-polymer, 9 mg/ft$^2$ surfactant, and 1 mg/ft$^2$ BVSME.

For % stain and % wandering tests, about 0.2 g of dye-polymers 4-11 were respectively dissolved in about 18 ml of water and warmed to about 50° C. About 1 g of gelatin was dissolved in about 10 ml water at a temperature of about 50° C. and then combined with the dye-polymer solution. About 0.05 g of surfactant I (0.5 ml of 10% surfactant I in water) and 0.01 g of bis(vinylsulfonylmethyl)ether (BVSME) (0.5 ml of 2% BVSME in water) were added to the dye-polymer solution. The resulting solution was hand coated onto a subbed polyethylene terephthalate film base (0.007 in thick) using a 6 mil knife at 100° F. (the coating block was kept at 100° F. while coating), then chill set and air dried for at least three days to provide 450 mg/ft$^2$ gelatin, 45 mg/ft$^2$ dye-polymer, 23 mg/ft$^2$ surfactant, and 4.5 mg/ft$^2$ BVSME.

For the speed loss test, polymers 1, 2, 4, 5, and 9 of Table 1 were machine coated on a polyethylene terephthalate support (0.007 in thick) in a separate filter layer. A silver halide emulsion layer for blue X-ray format is coated on the filter layer followed by a hardened gelatin overcoat. The filter layer contained a gelatin coverage of 100 mg/ft$^2$ and dye-polymer coverage of 30 mg/ft$^2$. The emulsion was coated at a coverage of 200 mg/ft$^2$ with 140 mg/ft$^2$ gelatin. Polymers 6 and 7 were coated as described above using green X-ray format.

The coatings were exposed at 70 kVp, 32 mAsm at a dustabce if 1.4 m. Filtration was with 3 mm Al equivalent (1.25 inherent+1.75 al); Half Value Layer (HLV)-2.6 mm Al. A 26 step Al wedge was used, differing in thickness by 2 mm per step.

The coatings were exposed with screens placed in contact with both sides of the film in the film holder during exposure. Blue X-ray coatings were exposed with simulated blue screen exposure. Over 90 of the exposure is produced by the fluorescent light and less than 10 by direct absorption of X-rays by the emulsion. Green X-ray coatings were exposed with simulated green screen exposure using a phosphor screen which emits low intensity green light with emission maximum wavelength at 550 nm.

The exposed substrates were then developed, fixed, and washed at 35° C. allowing only about 30 seconds for each step.

The developer/replenisher contained about 700 ml water, 15.8 ml strontium chloride hexahydrate, 8.8 mg lithium carbonate, 12.5 mg Lignosite 458[Georgia Pacific]), 0.06 g of 5-methylbenzotriazole, 8.85 g of sodium metabisulfite, 42.75 g of potassium hydroxide as a 45% solution, 0.56 g of boric anhydride 60 mesh (boron oxide), 4.74 g of anhydrous sodium carbonate, 3.75 g of anhydrous sodium bicarbonate, 10 g of diethylene glycol, 133.5 g of potassium sulfite (45% solution), 5.33 g of diethylenetriaminepentaacetic acid pentasodium salt (40% solution), 22 g of hydroquinone, 12.5 g of glacial acetic acid, 1.35 g of 1-phenyl-3-pyrazolidinone, 127 mg of 5-nitroindazole, 8.85 g of glutaraldehyde (50% solution), 3.45 g of sodium bromide, and sufficient water to make 1 liter at a pH at 27° C. of 10+/−0.1.

The fixer contained about 600 ml water, 20.7 g of glacial acetic acid, 4 g of sodium hydroxide (50% solution), 8.8 mg of anhydrous lithium carbonate, 15.8 mg of strontium chloride (hexahydrate), 238.8 g of ammonium thiosulfate (56.5% ammonium thiosulfate, 4% ammonium sulfite), 0.8 g of potassium iodide, 35.5 g of anhydrous sodium thiosulfate, 4.9 g of sodium metabisulfite, 3.23 g of sodium gluconate, 23.15 g of aluminum sulfate (25% solution), and sufficient water to make 1 liter at a pH at 27° C. of 4.1+/−0.1.

The coated substrates were then tested for % stain, which demonstrates bleachability, by measuring the optical density (O.D.) of the dye-polymer coatin both before and after sulfite bleaching using a Perkin Elmer 330 spectrophotometer. The stain is calculated using the equation: (O.D. after processing/O.D. before processing)×100. Polymer 2 provided only 0.06% stain; any value less than 1% is considered negligible.

The % wandering data for the polymeric dyes of the invention contained in the coatings described above and given in the following Table demonstrates the immobility of the polymeric dyes of the invention. Initially, the optical density of the coatings was measured using a Perkin-Elmer 330 spectrophotometer. Then a separate gelatin coating was extrusion coated onto a polyethylene terephthalate film base (0.007 in thick) to provide a coverage of 1000 mg/ft$^2$ of gelatin and 15 mg/ft$^2$ BVSME (hardener). The gelatin coating is then soaked in distilled water at room temperature for 2 minutes to allow the gelatin to swell. The dye-polymer coating and swollen gelatin coating were then laminated together by passing them together through a roller press. After exiting the roller press, the coatings were allow to remain in contact with each other at room temperature for about 20 additional minutes. The coatings are then peeled apart and air dried. The optical density of the dye-polymer coating is again measured and the % wandering is calculated using the equation: [1-(O.D. after lamination/O.D. before lamination)]×100.

Speed loss was determined for dye-polymers 1, 2, 4–7, and 9 as described for Examples 1–6 of U.S. Pat. No. 4,900,652 which is hereby incorporated herein by reference. Polymers 1, 2, 4, 5, and 9 contain Dye A and were coated in blue X-ray format and exposed with simulated blue screen exposure as described above. Polymers 6 and 7 contain Dye B, and were coated in green X-ray format and exposed using green X-ray coatings exposure as described in U.S. Pat. No. 4,900,652. After the coatings were exposed, speed was measured for the dye-polymer in gelatin filter layer with an emulsion layer and speed was also measured for a gelatin only filter layer with an emulsion layer as a control. The difference in speed (speed of control minus speed of dye-polymer coating) was recorded as a speed loss in CR units where 1 CR=0.01 Log E. A loss in speed indicates interlayer dye wandering.

TABLE 1

| POLYMER DYE | Mol Ratio | % Stain | % Wandering | Speed Loss(CR) |
|---|---|---|---|---|
| 1. CDA | 95/3/2 | 35 | 1 | 8(3)*** |
| 2. CEDA | 90/5/3/2 | 0.6 | 1 | 13(6)*** |
| 3. CEDA | 85/10/3/2 | 0 | 3 | — |
| 4. CEDA | 68/25/5/2 | — | 14 | 21 |
| 5. CEFA* | 68/25/5/2 | 0 | 5 | 16 |
| 6. CEFB | 68/25/5/2 | 0 | 9 | 45 |
| 7. CEDB | 69/25/5/2 | 0 | 8 | 72 |
| 8. GA** | 98/2 | 11 | 0 | — |
| 9. GFA | 90/8/2 | 0 | 17 | 21 |
| 10. GB | 98/2 | 8 | 3 | — |

*F = 2-acrylamido-2-methyl propane sulfonic acid, sodium salt.
**G = acrylamide.
***Values in parens are for coatings containing about 2 mg/ft$^2$ of BVSME hardener in the filter layer before the emulsion layer was coated on top of it. The hardened filter layer coatings provided lower speed loss values corresponding to less interlayer dye wandering.

The test results for polymer dyes 2 and 3 illustrate rapid irreversible sulfite bleaching since gelatin coatings bleached during sulfite processing in less than 30 seconds as incidated by dye stain results of zero or less than 1. Further, the fact that the filter dye is immobilized in a gelatin coating by covalent attachment to the polymer is demonstrated by the wandering results which show that the dyes do not wander out of the filter layer, particularly for polymer dyes 2 and 3. Finally, the speed loss data confirms minimal wandering of polymer dye 2 from the filter layer, especially when the polymer-containing gelatin coating is hardened before coating another layer such as an emulsion layer.

As the polymeric dye polymers of the invention become more hydrophilic and soluble in basic sulfite solution (increasing E and decreasing C), there is an increase in bleachability and an increase in wandering. The same is seen with the polymers containing G where increasing hydrophilicity (addition of F) increases bleachability and increases wandering.

The new polymeric dyes of the invention are coatable with gelatin, irreversibly bleachable, and non-wandering, particularly in machine coatings prepared using blue X-ray format although such results are also observed in polymer dye containing coatings without an emulsion layer (not X-ray format). Most preferred are the CEDA polymeric dyes, particularly numbered 2. and 3. in the above Table. Both bleach (0 or less than 1% dye stain) during processing and show minimum wandering.

Although the invention has been described in considerable detail in the foregoing, such detail is solely for the purpose of illustration. Variations can be made by those skilled in the art without departing from the spirit and scope of the invention. except as set forth in the claims.

What is claimed is:

1. An irreversibly bleachable polymeric filter dye for photographic elements comprising a polymer of methyl acrylate, methacrylic acid, methacrylate, acrylamide, methacrylamide, acrylate, or mixtures thereof covalently bonded to a benzoxazole styryl chromophore.

2. The polymeric dye of claim 1 wherein the benzoxazle styryl chromophore is covalently bonded to a copolymer of methyl acrylate, methacrylic acid, and sulfoethylmethacrylate.

3. The polymeric dye of claim 2 containing from about 2 to about 5 mol percent of a covalently bonded benzoxazole styryl chromophore.

4. The polymeric dye of claim 2 containing methyl acrylate (C)/methacrylic acid (E)/2-sulfoethyl methacrylate (sodium salt) (D)/ 5-acrylamido-N-ethyl-2-(4-dimethylaminophenyl ethylidenyl) benzoxazolium p-toluene sulfonate (A) at mol ratios ranging from about 75 to 92 (C), from about 20 to 3 (E), from about 3 to 10 (D), and from about 2 to 5 (A).

5. The polymeric dye of claim 4 containing mol ratios ranging from about 85 to 90 (C), from about 5 to 10 (E), about 3 to 5 (D), and about 2 (A).

6. The polymeric dye of claim 5 containing C, E, D, and A at mol ratios of 90/5/3/2.

7. The polymeric dye of claim 5 containing C, E, D, and A at mol ratios of 85/10/3/2.

8. A polymeric dye of claim 2 which bleaches irreversibly in thirty seconds or less under sulfite developing conditions.

* * * * *